United States Patent
Bhatoolaul et al.

(10) Patent No.: US 12,426,050 B2
(45) Date of Patent: Sep. 23, 2025

(54) METHOD FOR EFFICIENT HARQ FEEDBACK USING TWO LEVELS OF PUCCH REPORTING FOR MULTICAST/BROADCAST USERS IN NR

(71) Applicant: Nokia Technologies Oy, Espoo (FI)

(72) Inventors: David Bhatoolaul, Wiltshire (GB); Volker Pauli, Ansbach (DE); Fasil Berhanu Tesema, Munich (DE); David Navratil, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 400 days.

(21) Appl. No.: 18/021,485

(22) PCT Filed: Jul. 28, 2021

(86) PCT No.: PCT/EP2021/071136
§ 371 (c)(1),
(2) Date: Feb. 15, 2023

(87) PCT Pub. No.: WO2022/037915
PCT Pub. Date: Feb. 24, 2022

(65) Prior Publication Data
US 2023/0309101 A1    Sep. 28, 2023

Related U.S. Application Data

(60) Provisional application No. 62/706,444, filed on Aug. 17, 2020.

(51) Int. Cl.
*H04W 72/21* (2023.01)
*H04L 5/00* (2006.01)

(52) U.S. Cl.
CPC ........... *H04W 72/21* (2023.01); *H04L 5/0053* (2013.01)

(58) Field of Classification Search
CPC .. H04W 72/21; H04W 74/004; H04L 5/0053; H04L 1/0061; H04L 1/1607;
(Continued)

(56) References Cited

U.S. PATENT DOCUMENTS

| | | | |
|---|---|---|---|
| 11,025,371 B2* | 6/2021 | Zhang | H04W 72/04 |
| 2013/0163532 A1* | 6/2013 | Anderson | H04L 5/0053 |
| | | | 370/329 |

(Continued)

FOREIGN PATENT DOCUMENTS

| WO | WO 2016/119209 A1 | 8/2016 |
|---|---|---|
| WO | WO 2017/035727 A1 | 3/2017 |

*Primary Examiner* — Peter G Solinsky
*Assistant Examiner* — Michael Wayne Maddox
(74) *Attorney, Agent, or Firm* — Carter, DeLuca & Farrell LLP (57) ABSTRACT

Techniques of transmitting and receiving HARQ feedback for point to multipoint data packets include using two different PUCCHs for providing ACK/NACK feedback to a sequence of point-to-multipoint (PTM) data packets. For example, when a gNB sends PTM data packets (e.g., as part of a subscription) to subscriber UE's, each UE sends ACK/NACK messages in response over a first PUCCH which has a smaller bandwidth than a conventional PUCCH under which full uplink control information (UCI) may be sent. In some implementations, the ACK/NACK messages are a single bit. In response to a NACK message from a UE, the gNB allocates a second PUCCH to the UE. The UE then send additional details to explain the NACK message. In some implementations, the additional details include an identifier of a missing data (e.g., packet m of n).

1 Claim, 9 Drawing Sheets

(58) Field of Classification Search
CPC ... H04L 1/1829; H04L 1/1848; H04L 1/1896; H04L 5/0055; H04L 5/00; H04L 2001/0093; H04L 1/1635; H04L 1/16; H04L 1/18; H04L 1/00
See application file for complete search history.

(56) References Cited

U.S. PATENT DOCUMENTS

| | | | |
|---|---|---|---|
| 2015/0195072 A1* | 7/2015 | Seo | H04L 1/1614 370/329 |
| 2018/0212743 A1* | 7/2018 | Dinan | H04L 5/0053 |
| 2020/0204329 A1 | 6/2020 | Fujishiro et al. | |
| 2020/0213058 A1* | 7/2020 | Choi | H04W 72/20 |
| 2022/0045826 A1* | 2/2022 | Huang | H04L 1/1864 |

\* cited by examiner

METHOD FOR EFFICIENT HARQ FEEDBACK USING TWO LEVELS OF PUCCH REPORTING FOR MULTICAST/BROADCAST USERS IN NR

CROSS REFERENCE TO RELATED APPLICATION

This patent application is a U.S. National Stage application of International Patent Application Number PCT/EP2021/071136 filed Jul. 28, 2021, which claims priority to U.S. Provisional Application No. 62/706,444 filed Aug. 17, 2020, which are hereby incorporated by reference in their entireties.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE), a set of point-to-multipoint (PTM) data packets from a base station (gNB); after receiving the set of PTM data packets, transmitting an indication of whether an event involving the set of PTM data packets has occurred to the gNB over a first physical uplink control channel (PUCCH); in response to the occurrence of the event, transmitting event data representing additional details of the event over a second PUCCH distinct from the first PUCCH.

According to an example implementation, an apparatus includes at least processor and at least one memory including computer program code, the at least one memory and the computer program code configured to, with the at least one processor, cause the apparatus at least to receive a set of point-to-multipoint (PTM) data packets from a base station (gNB); after receiving the set of PTM data packets, transmit an indication of whether an event involving the set of PTM data packets has occurred to the gNB over a first physical uplink control channel (PUCCH); in response to the occurrence of the event, transmit event data representing additional details of the event over a second PUCCH distinct from the first PUCCH.

According to an example implementation, an apparatus includes means for receiving a set of point-to-multipoint (PTM) data packets from a base station (gNB); means for, after receiving the set of PTM data packets, transmitting an indication of whether an event involving the set of PTM data packets has occurred to the gNB over a first physical uplink control channel (PUCCH); means for, in response to the occurrence of the event, transmitting event data representing additional details of the event over a second PUCCH distinct from the first PUCCH.

According to an example implementation, a computer program product includes a computer-readable storage medium and storing executable code that, when executed by at least one data processing apparatus, is configured to cause the at least one data processing apparatus to receive a set of point-to-multipoint (PTM) data packets from a base station (gNB); after receiving the set of PTM data packets, transmit an indication of whether an event involving the set of PTM data packets has occurred to the gNB over a first physical uplink control channel (PUCCH); in response to the occurrence of the event, transmit event data representing additional details of the event over a second PUCCH distinct from the first PUCCH.

According to an example implementation, a method includes transmitting, by a base station (gNB), a set of point-to-multipoint (PTM) data packets to at least one user equipment (UE); receiving, over a first physical uplink control channel (PUCCH) from a UE, an indication of whether an event involving the set of PTM data packets has occurred; and in response to the indication indicating that the event has occurred, allocating a second PUCCH distinct from the first PUCCH to the UE.

According to an example implementation, an apparatus includes at least processor and at least one memory including computer program code, the at least one memory and the computer program code configured to, with the at least one processor, cause the apparatus at least to transmit a set of point-to-multipoint (PTM) data packets to at least one user equipment (UE); receive, over a first physical uplink control channel (PUCCH) from a UE, an indication of whether an event involving the set of PTM data packets has occurred; and, in response to the indication indicating that the event has occurred, allocate a second PUCCH distinct from the first PUCCH to the UE.

According to an example implementation, an apparatus including a first TRP includes means for transmitting a set of point-to-multipoint (PTM) data packets to at least one user equipment (UE); means for receiving, over a first physical uplink control channel (PUCCH) from a UE, an indication of whether an event involving the set of PTM data packets has occurred; and means for, in response to the indication indicating that the event has occurred, allocating a second PUCCH distinct from the first PUCCH to the UE.

According to an example implementation, a computer program product includes a computer-readable storage medium and storing executable code that, when executed by at least one data processing apparatus, is configured to cause the at least one data processing apparatus to transmit a set of point-to-multipoint (PTM) data packets to at least one user equipment (UE); receive, over a first physical uplink control channel (PUCCH) from a UE, an indication of whether an event involving the set of PTM data packets has occurred; and, in response to the indication indicating that the event has occurred, allocate a second PUCCH distinct from the first PUCCH to the UE.

The details of one or more examples of implementations are set forth in the accompanying drawings and the description below. Other features will be apparent from the description and drawings, and from the claims.

DETAILED DESCRIPTION

Figure 1:
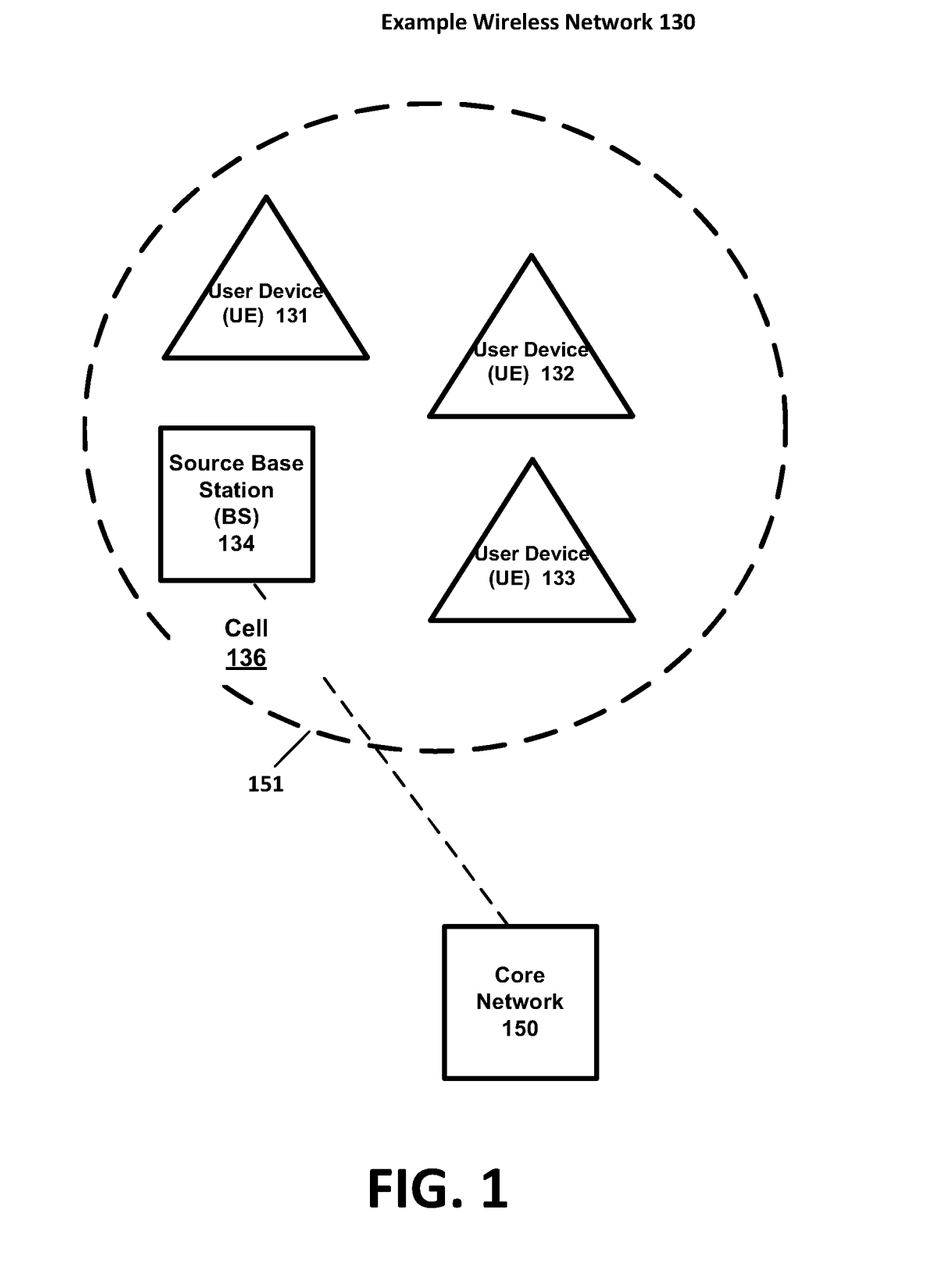
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e) Node B (eNB) may also be carried out by any node, server or host which may be operably coupled to a transceiver, such as a remote radio head. BS (or AP) 134 provides wireless coverage within a cell 136, including to user devices 131, 132, and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Multicast and broadcast systems (IVIES) are systems in which a base station (gNB) sends the same content information to multiple users, e.g., subscribers, in a cell. Point to multipoint (PTM) transmission is communication accomplished via a distinct type of one-to-many connection, providing multiple paths from a single location to multiple locations. Herein, PTM transmissions are expected to efficiently provision MBS services to multiple users by using the same radio framework as unicast transmission.

In wireless technologies, retransmission-based error recovery techniques are widely exploited to ensure the reliable transmission of data despite it being received with errors. Typically, Automatic Repeat reQuest (ARQ), which is implemented for Radio Link Control (RLC) acknowledged mode, and Hybrid Automatic Repeat reQuest (HARQ), which is implemented in the MAC/PHY radio sublayer of LTE and 5G, are used to tailor the retransmission of data for improving the reliability of radio links. However, both of these retransmission techniques are specified for unicast services.

For MBS, 3GPP has studied (TR 36.890) the potential use of HARQ for improving the reliability of Point to Multi- Point (PTM) radio transmissions. The results of that study show that HARQ can improve transmissions in the presence of errors. However, when there is a large number of UEs consuming the IVIES service, there are many HARQ ACK/NACK feedback messages, leading to high signalling overhead and resource inefficiency. One solution that was proposed as an alternative technique to attain the required reliability level was the so called "enhanced Outer Loop Link Adaptation (eOLLA)" technique, which adjusts the Modulation and Coding Scheme (MCS) to an increasingly conservative setting based on the worst positioned UE. However, for the same number of UEs (where the eOLLA does not react), there might be bursty errors that randomly occur over time (due to fading and power degradations), leading to loss of protocol data units. As such, maintaining a reasonably efficient MCS along with data retransmission via HARQ (for lost/decode-fail data units) is crucial to improve the reliability of the link. Among the set of UEs consuming the IVIES, there is a variety of error rates, ranging from persistent zero error rate for some UEs in favourable conditions, over UEs with intermittent bursts of reception errors to cell-edge UEs that frequently encounter reception failures. A particular UE may assume any of these roles in time based on mobility.

Conventional approaches to communications using PTM transmission do either not consider feedback-triggered retransmissions at all or include allocating a dedicated physical uplink control channel (PUCCH) for collecting HARQ ACK/NACK feedback from each UE in an IVIES system.

When there is a large number of UEs consuming the IVIES service, there are many HARQ ACK/NACK feedback messages, leading to high signalling overhead and resource inefficiency. Therefore, a method for supporting HARQ ACK/NACK feedback from many UEs but with significantly lower overhead and higher resource efficiency is needed, in particular one that reflects that UEs with persistently good reception conditions can acknowledge this to the network in a way that is much more efficient compared to what is required to indicate ACK/NACK on a per-packet basis.

In contrast to the above described approach to gathering HARQ feedback for PTM packets, an improved technique includes using two different PUCCHs for providing ACK/NACK feedback to a sequence of point-to-multipoint (PTM) data packets. For example, when a gNB sends PTM data packets (e.g., as part of a subscription) to subscriber UE's, each UE sends ACK/NACK messages in response over a first PUCCH which has a smaller bandwidth than a conventional PUCCH under which full uplink control information (UCI) may be sent. In some implementations, the ACK/NACK messages are a single bit. In response to a NACK message from a UE, the gNB allocates a second PUCCH to the UE. The UE then send additional details to explain the NACK message. In some implementations, the additional details include an identifier of a missing data packet (e.g., packet m of n), or a bit map indicating missing data packets.

Advantageously, the above-described improved technique of providing HARQ feedback can reduce signaling overhead and increase resource efficiency. Persistently allocating a very small PUCCH to each UE and only allocating the second PUCCH as needed may result in significantly lower overhead and increased resource efficiency. Accordingly, the improved techniques address large number of uplink resources that the gNB is required to reserve for dedicated ACK/NACK feedback from high number of UEs.

The key idea is to introduce a new method for UEs to use two different Physical Uplink Control Channels (PUCCHs), each of which provides—in a single message—ACK/NACK feedback to a sequence of PTM packets, where:

One format, PUCCH #1, can only carry a single aggregate ACK/NACK to indicate that a number of PTM transmissions have been received without any errors (ACK) or with at least one error in the set of transmissions (NACK). This small PUCCH is allocated to the UE continuously (semi-persistently) in a periodic pattern.

Another format, PUCCH #2, can provide accumulated ACK/NACK feedback at packet resolution, such that the network knows, which packets should be retransmitted. The network schedules PUCCH #2 only on demand based on the feedback received on PUCCH #1, i.e., if a NACK on PUCCH #1 indicated that some packet has not been received correctly by the UE.

Both PUCCHs are only used periodically to provide feedback on a number of packets in a single message and not in response to every single received packet. Depending on its reception conditions a UE will thus be configured to use the compact PUCCH #1 and/or the PUCCH #2 that can provide detailed feedback per packet.

Figure 2:
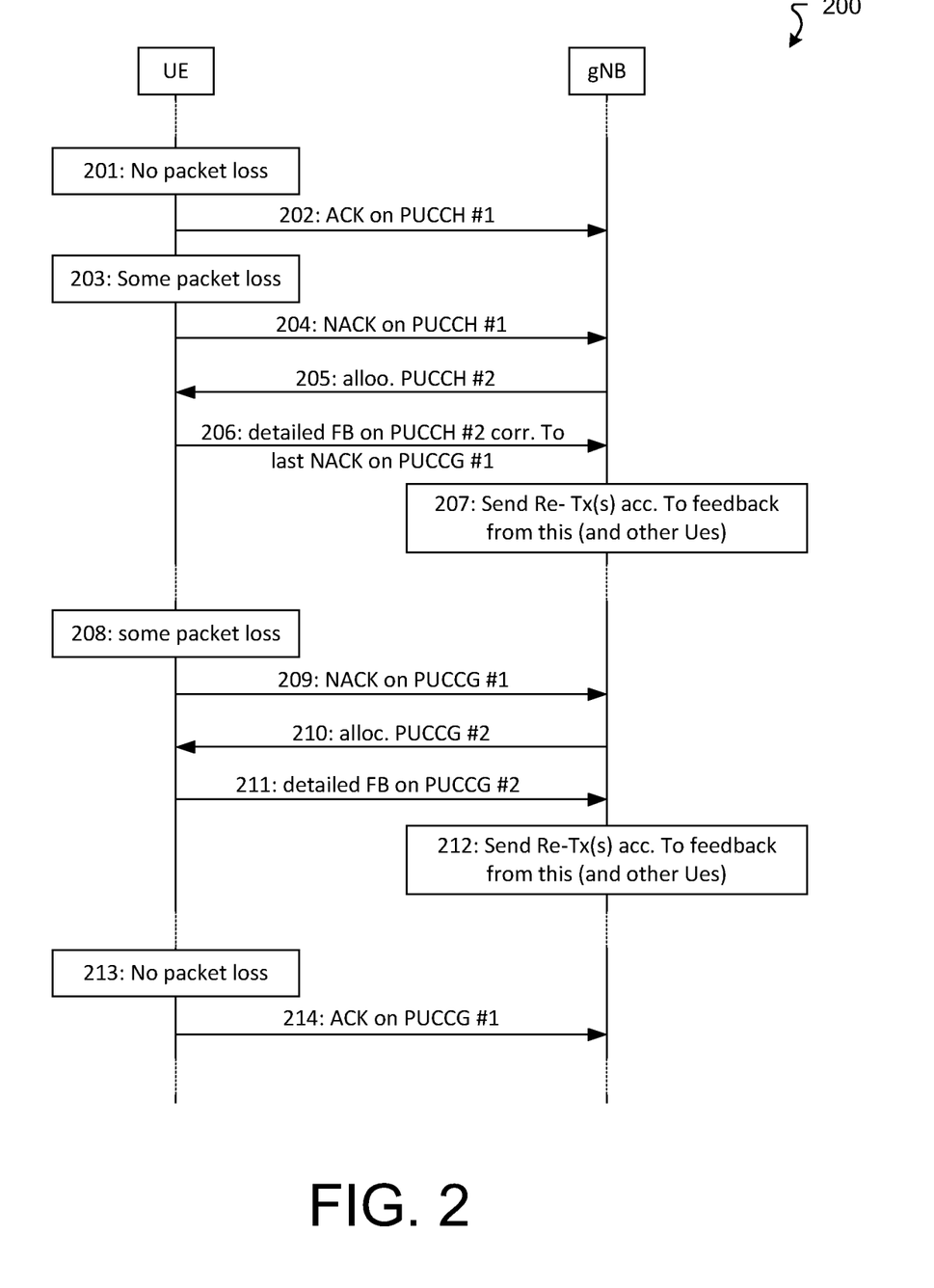
FIG. 2 is a sequence diagram illustrating a process for two-level HARQ feedback according to an example implementation.

FIG. 2 is a sequence diagram illustrating a process 200 for two-level HARQ feedback. The process 200 is described as follows:

At 201, as long as the UE does not detect any reception failures, the UE at 202 periodically reports ACK (e.g., 1 bit UCI) on PUCCH #1 for groups of PTM packets.

When the UE at 203 detects a reception failure, at 204 it reports NACK (e.g., 1 bit in UCI) on the next opportunity to report on PUCCH #1.

In response to this, at 205 the gNB dynamically grants the UE resources for PUCCH #2.

The UE at 206 responds on PUCCH #2 with detailed HARQ feedback on the packets corresponding to the unified NACK on the last PUCCH #1.

The gNB at 207 processes the detailed HARQ feedback, in general in conjunction with HARQ feedback collected from other UEs, and sends retransmissions accordingly.

In some implementations, the gNB deallocates the resources for PUCCH #2 after sending the retransmission. As shown in FIG. 2, at 208 the UE experiences some further packet loss and in response, at 209, the UE sends a NACK over PUCCH #1. In response, the gNB at 210 allocates PUCCH #2 to the UE, over which at 211 the UE sends detailed feedback to the gNB. The gNB at 212 processes the detailed HARQ feedback, in general in conjunction with HARQ feedback collected from other UEs, and sends retransmissions accordingly. Upon experiencing no packet loss at 213, the UE sends an ACK at 214 over PUCCH #1 to the gNB.

This process 200 will be applicable to UEs in CONNECTED mode. However, in some implementations, the introduction of the possibility to transmit PUCCH and other short messages in INACTIVE mode may be considered. In this case, the procedure proposed in this IR could also be applied for UEs in INACTIVE mode.

The process 200 has the advantage that only UEs that may have NACKs send detailed feedback occupying a relatively large PUCCH #2, while UEs that are currently in good reception conditions only send unified 1-bit ACKs representing multiple past packets while occupying only very limited PUCCH resources. When required, i.e., in case of reception errors, PUCCH #2 can be allocated dynamically and rapidly from a pool of RRC configured PUCCH resources using L1 signalling, i.e., by sending an appropriate DCI on the PDCCH. Assuming that link adaptation manages to control the MCS to suit the cell edge UEs with a tolerable 1st transmission BLER of e.g., 20%, most UEs in the cell should typically experience no or only very rare reception failures. The transition between the two reporting states can be adapted dynamically on a per-need basis (e.g., when the UE moves between favourable and unfavourable reception conditions) such that PUCCH #2 resources can be reallocated to the few UEs in the cell that need PUCCH #2 at a given point in time and hence the pool of resources that must be reserved by RRC for this purpose can be kept small.

In some implementations, PUCCH #1 is designed not as a 1-bit ACK/NACK indicator, but is equipped with the capability to indicate the position of one single error in the set of transmissions to which this PUCCH #1 message applies. This would require an additional $\log_2(N)$ bits, where N denotes the number of transmissions represented by the PUCCH #1 message. With this, transitioning from PUCCH #1 to PUCCH #2 reporting would not necessarily have to start on the first transmission error, but could be postponed until more than one error occurred in the set of transmissions covered by one PUCCH #1 message. Similarly, M bit errors could directly be reported using M $\log_2(N)$ bits, trading off efficiency of PUCCH #1 size vs. frequency of using PUCCH #2.

In some implementations, PUCCH #1 is designed not as a 1-bit ACK/NACK indicator, but 2 or more bits are used to indicate a number of erroneous receptions. For example, 2-bit indicator can indicate that a UE experienced no errors (e.g., '00' no errors) or the number of erroneous reception that is no more than a first value (e.g., '01' no more than 2 errors), or a second value (e.g., '02' no more than 4 errors), etc. The gNB may prioritize the allocation of PUCCH #2 to UEs that indicated larger number of errors.

In some implementations, instead of dynamically allocating each instance of PUCCH #2 in response to a NACK on PUCCH #1, PUCCH #2 allocation can be made semi-persistent, as well, trading PUCCH efficiency for PDCCH efficiency. This could be implemented as follows. Whenever the gNB receives a NACK via PUCCH #1, it allocates PUCCH #2 semi-persistently to the UE. In addition, the network (re-)starts a UE-specific timer or counter (PTM Feedback Mode (PTM-FM) timer/counter), which is also reset and restarted whenever at least one NACK is received inside a PUCCH #2 message. As long as the UE has PUCCH #2 allocated, it can directly report ACK/NACKs there without prior indication of NACK on PUCCH #1. When this timer/counter expires, because the UE has only reported ACKs for a sufficiently long time, the PUCCH #2 resource allocation is revoked and the UE goes back to only reporting short ACK/NACK feedback on PUCCH #1.

Figure 3:
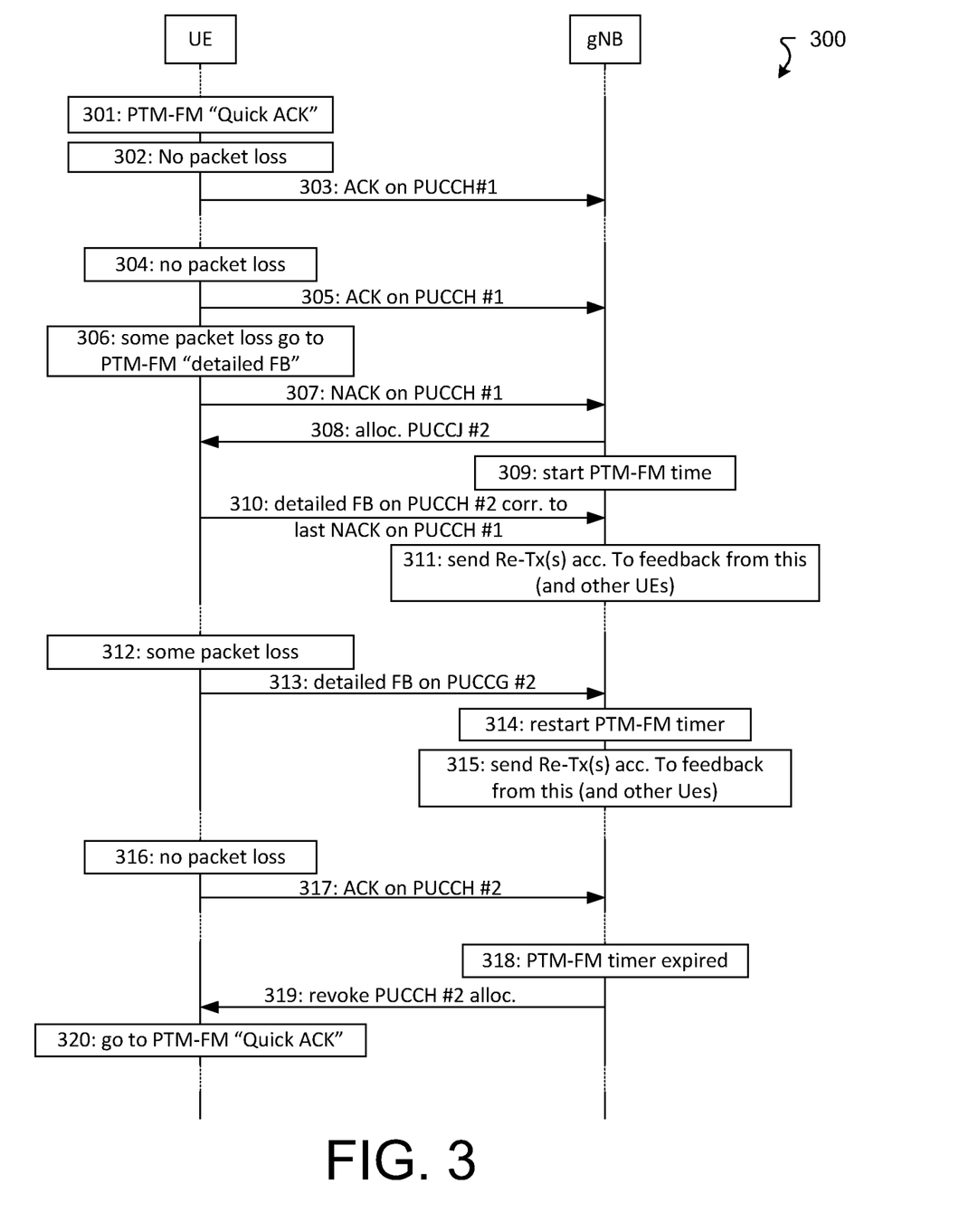
FIG. 3 is a sequence diagram illustrating a process for two-level HARQ feedback with timer/counter-based (at the gNB) semi-static allocation of a second PUCCH according to an example implementation.

FIG. 3 is a sequence diagram illustrating a process 300 for two-level HARQ feedback with timer/counter-based (at the gNB) semi-static allocation of a second PUCCH. In some implementations, the counter counts a number of ACK messages received. The process 300 is described as follows:

At 301, 302, and 304, as long as the UE does not detect any reception failures, The UE at 303 and 305, respectively, periodically reports ACK (e.g., 1 bit UCI) on PUCCH #1 for groups of PTM packets.

When the UE at 306 detects a reception failure, at 307 it reports NACK (e.g., 1 bit in UCI) on the next opportunity to report on PUCCH #1.

In response to this, at 308 the gNB dynamically grants the UE resources for PUCCH #2 and at 309, begins a timer/counter.

The UE at 310 responds on PUCCH #2 with detailed HARQ feedback on the packets corresponding to the unified NACK on the last PUCCH #1.

The gNB at 311 processes the detailed HARQ feedback, in general in conjunction with HARQ feedback collected from other UEs, and sends retransmissions accordingly.

In some implementations, in response to additional packet loss at the UE at 312 and subsequent detailed feedback over PUCCH #2 at 313, the gNB restarts the timer or counter at 314. In this case, the gNB at 315 processes the detailed HARQ feedback, in general in conjunction with HARQ feedback collected from other UEs, and sends retransmissions accordingly. As shown in FIG. 3, some time/count may pass, e.g., as the UE experiences no packet loss at 316 and only sends ACK messages to the gNB at 317 over PUCCH #1. In this case, after enough time has passed such that the timer/counter expires at 318, at 319 the gNB deallocates resources for PUCCH #2 for the UE by sending an appropriate message to the UE, which at 320 reverts to having only PUCCH #1.

In some implementations, the timer/counter may also run on the UE side. In this case, the timer/counter is configured by the network (e.g., via RRC signaling). Based on this the UE determines itself, how long it may use the PUCCH #2 without an explicit revoking of the PUCCH #2 allocation by means of a message from the gNB.

Figure 4:
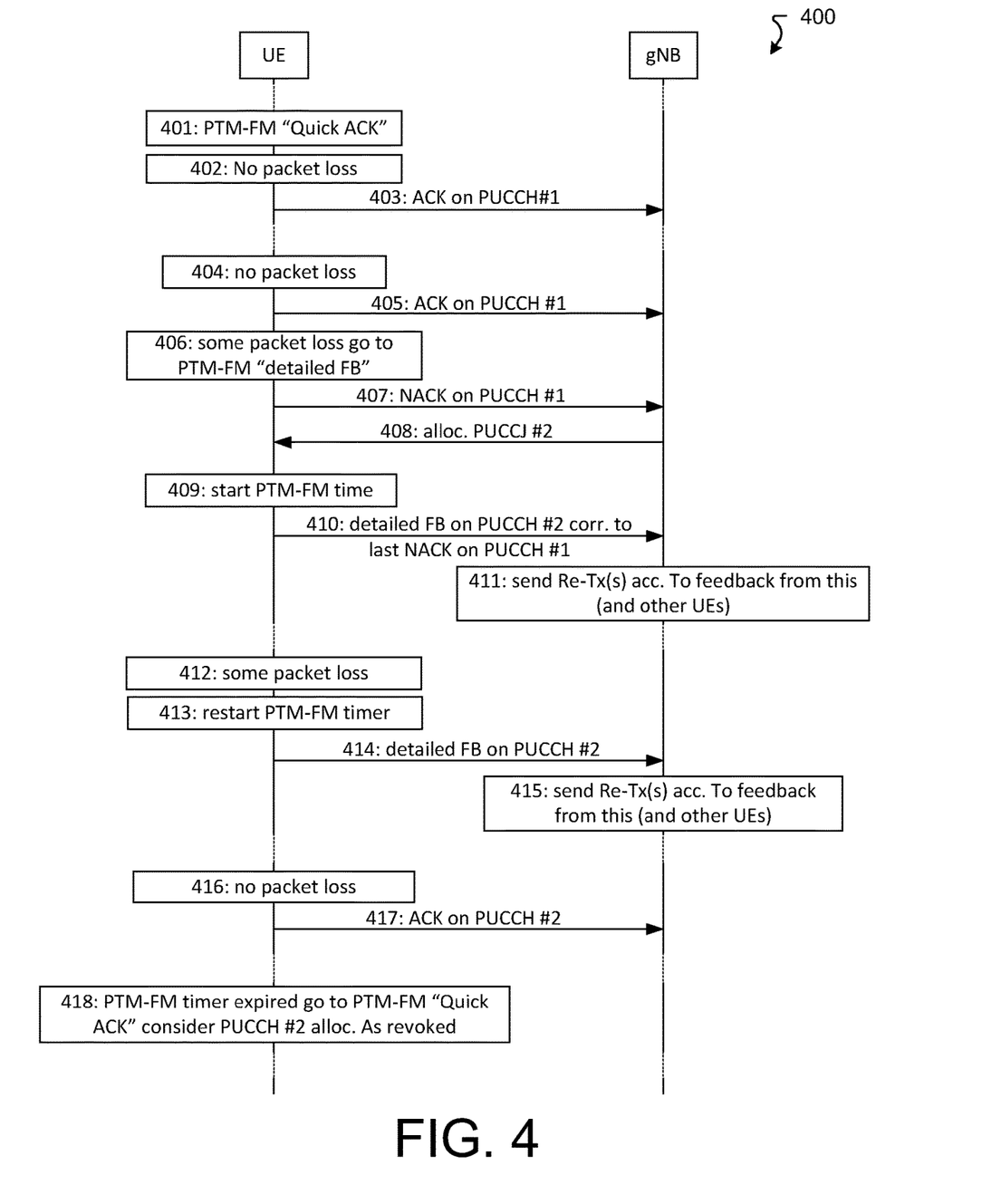
FIG. 4 is a sequence diagram illustrating a process for two-level HARQ feedback with timer/counter-based (at the UE) semi-static allocation of a second PUCCH according to an example implementation.

FIG. 4 is a sequence diagram illustrating a process 400 for two-level HARQ feedback with timer/counter-based (at the UE) semi-static allocation of a second PUCCH. In some implementations, the counter counts a number of ACK messages sent. The process 400 is described as follows:

At 401, 402, and 404, as long as the UE does not detect any reception failures, The UE at 403 and 405, respectively, periodically reports ACK (e.g., 1 bit UCI) on PUCCH #1 for groups of PTM packets.

When the UE at 406 detects a reception failure, at 407 it reports NACK (e.g., 1 bit in UCI) on the next opportunity to report on PUCCH #1.

In response to this, at 408 the gNB dynamically grants the UE resources for PUCCH #2. The UE then at 409 begins a timer/counter configured by the network over RRC.

The UE at 410 responds on PUCCH #2 with detailed HARQ feedback on the packets corresponding to the unified NACK on the last PUCCH #1.

The gNB at 411 processes the detailed HARQ feedback, in general in conjunction with HARQ feedback collected from other UEs, and sends retransmissions accordingly.

In some implementations, in response to additional packet loss at the UE at 412, the UE restarts the timer/counter at 413 and sends subsequent detailed feedback over PUCCH #2 at 414. In this case, the gNB at 415 processes the detailed HARQ feedback, in general in conjunction with HARQ feedback collected from other UEs, and sends retransmissions accordingly. As shown in FIG. 4, some time may pass, e.g., as the UE experiences no packet loss at 416 and only sends ACK messages to the gNB at 417 over PUCCH #1. In this case, after enough time/count has passed such that the timer/counter expires at 418, the resources for PUCCH #2 for the UE are deallocated.

In some implementations, in order to avoid delays, the gNB may respond to reception of a NACK on PUCCH #1 with retransmission of all corresponding packets. PUCCH #2 is then allocated from the next reporting period onwards.

Figure 5:
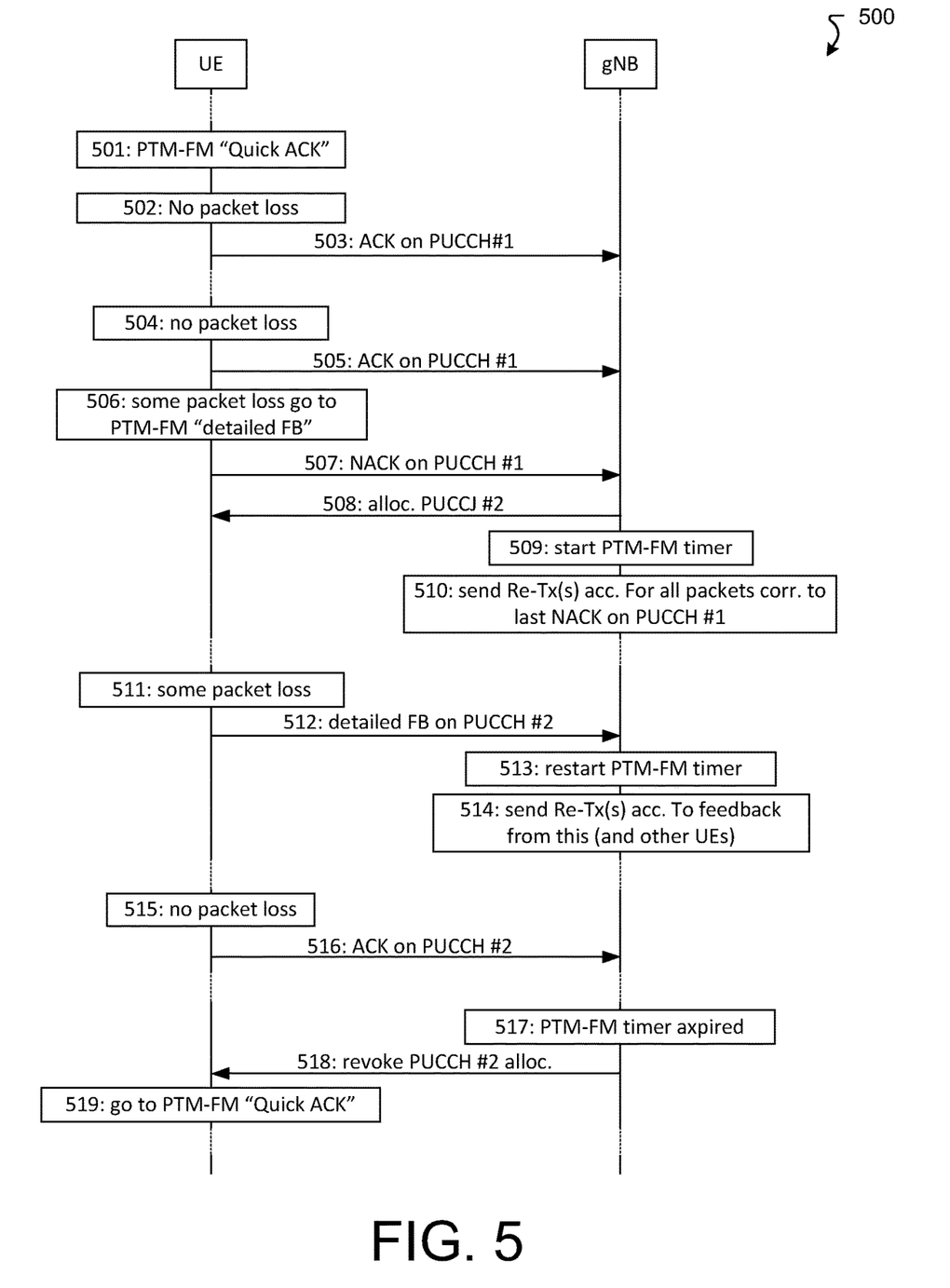
FIG. 5 is a sequence diagram illustrating a process for two-level HARQ feedback with timer/counter-based (at the gNB) semi-static allocation of a second PUCCH according to an example implementation.

FIG. 5 is a sequence diagram illustrating a process 500 for two-level HARQ feedback with timer/counter-based (at the gNB) semi-static allocation of a second PUCCH. In some implementations, the counter counts a number of ACK messages received. The process 500 is described as follows:

At 501, 502, and 504, as long as the UE does not detect any reception failures, The UE at 503 and 505, respectively, periodically reports ACK (e.g., 1 bit UCI) on PUCCH #1 for groups of PTM packets.

When the UE at 506 detects a reception failure, at 507 it reports NACK (e.g., 1 bit in UCI) on the next opportunity to report on PUCCH #1.

In response to this, at 508 the gNB dynamically grants the UE resources for PUCCH #2 and at 509, begins a timer.

The gNB at 510, without waiting for a detailed feedback over PUCCH #2 from the UE, sends retransmissions of all packets corresponding to the prior NACK received over PUCCH #1.

In response to some packet loss at the UE at 511, the UE at 512 responds on PUCCH #2 with detailed HARQ feedback on the packets corresponding to the unified NACK on the last PUCCH #1.

The gNB at 513 restarts the timer and at 514 processes the detailed HARQ feedback, in general in conjunction with HARQ feedback collected from other UEs, and sends retransmissions accordingly.

As shown in FIG. 5, some time may pass, e.g., as the UE experiences no packet loss at 515 and only sends ACK messages to the gNB at 516 over PUCCH #1. In this case, after enough time has passed such that the timer expires at 517, at 518 the gNB deallocates resources for PUCCH #2 for the UE by sending an appropriate deallocation message to the UE, which at 519 reverts to having only PUCCH #1.

Figure 6:
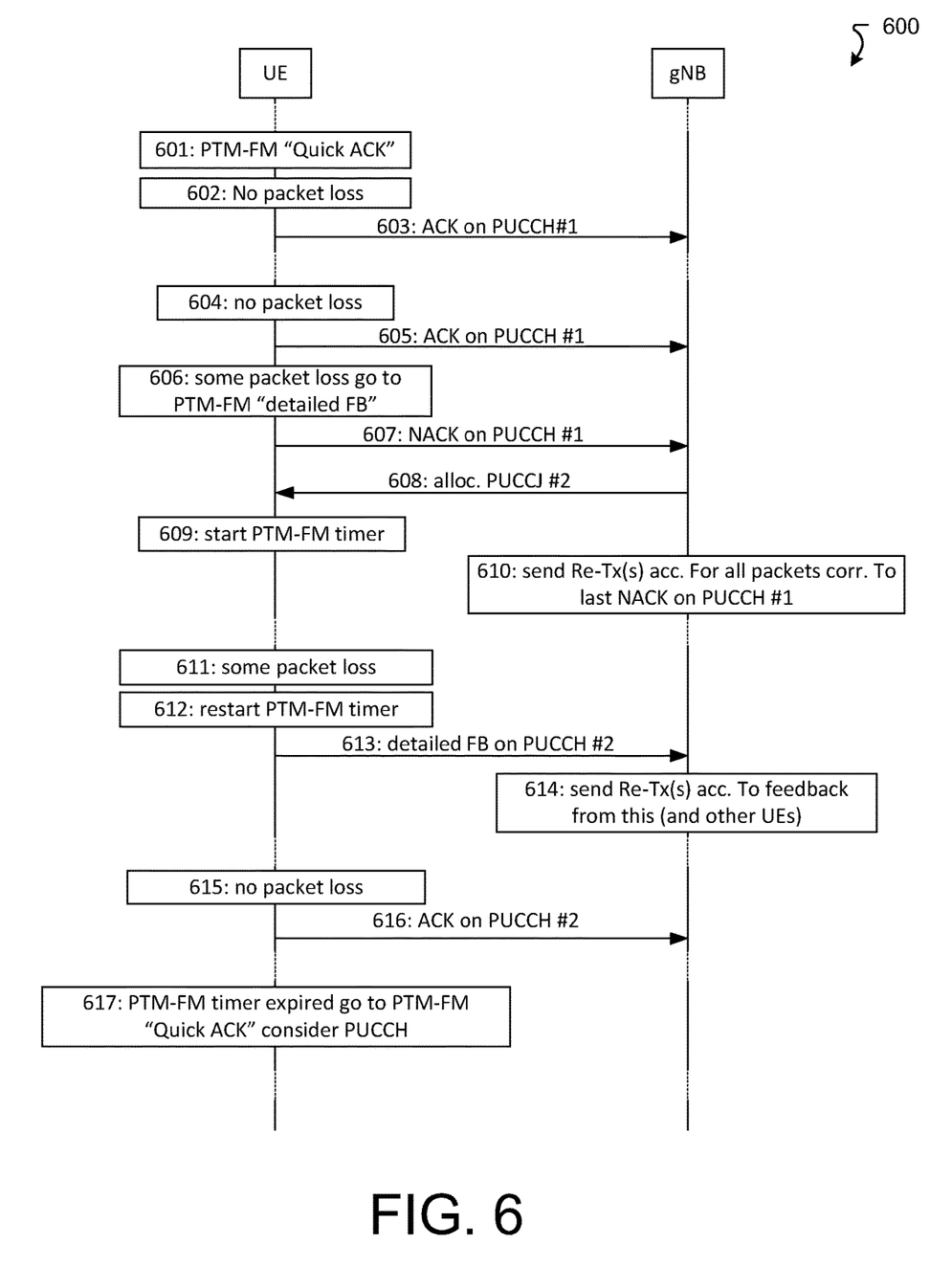
FIG. 6 is a sequence diagram illustrating a process for two-level HARQ feedback with timer/counter-based (at the UE) semi-static allocation of a second PUCCH according to an example implementation.

FIG. 6 is a sequence diagram illustrating a process 600 for two-level HARQ feedback with timer/counter-based (at the UE) semi-static allocation of a second PUCCH. In some implementations, the counter counts a number of ACK messages sent. The process 600 is described as follows:

At 601, 602, and 604, as long as the UE does not detect any reception failures, The UE at 603 and 605, respectively, periodically reports ACK (e.g., 1 bit UCI) on PUCCH #1 for groups of PTM packets.

When the UE at 606 detects a reception failure, at 607 it reports NACK (e.g., 1 bit in UCI) on the next opportunity to report on PUCCH #1.

In response to this, at 608 the gNB dynamically grants the UE resources for PUCCH #2. The UE then at 609 begins a timer/counter configured by the network over RRC.

The gNB at 610, without waiting for a detailed feedback over PUCCH #2 from the UE, sends retransmissions of all packets corresponding to the prior NACK received over PUCCH #1.

In response to some packet loss at the UE at 611, the UE at 612 restarts the timer/counter and at 613, the UE responds on PUCCH #2 with detailed HARQ feedback on the packets corresponding to the unified NACK on the last PUCCH #1.

The gNB at 614 processes the detailed HARQ feedback, in general in conjunction with HARQ feedback collected from other UEs, and sends retransmissions accordingly.

As shown in FIG. 6, some time may pass, e.g., as the UE experiences no packet loss at 615 and only sends ACK messages to the gNB at 616 over PUCCH #1. In this case, after enough time/count has passed such that the timer/counter expires at 617 and the resources for PUCCH #2 are deallocated from the UE, which reverts to having only PUCCH #1.

In some implementations, explicit higher and/or lower layer signalling from the gNB could also be defined to swap between the two PUCCH resource types before the expiry of the timer/counter/session. Situations where such an option might be used include the following:

where PUCCH #2 resources are scarce and need to be re-assigned to UEs with higher priority, either absolute or e.g., because the latter experience higher error rates; and where PUCCH #2 resources are plentiful and the number of served UEs has dropped below a certain level, making permanent use of PUCCH #2 more efficient than PUCCH #1.

In some implementations, in line with error protection for major PUCCH messages, PUCCH #2 may be equipped with a cyclic redundancy check (CRC) for error detection. If the CRC indicates a PUCCH #2 decoding error the gNB assumes that all packets have been NACK-ed and retransmits all packets corresponding to the PUCCH #2.

Figure 7:
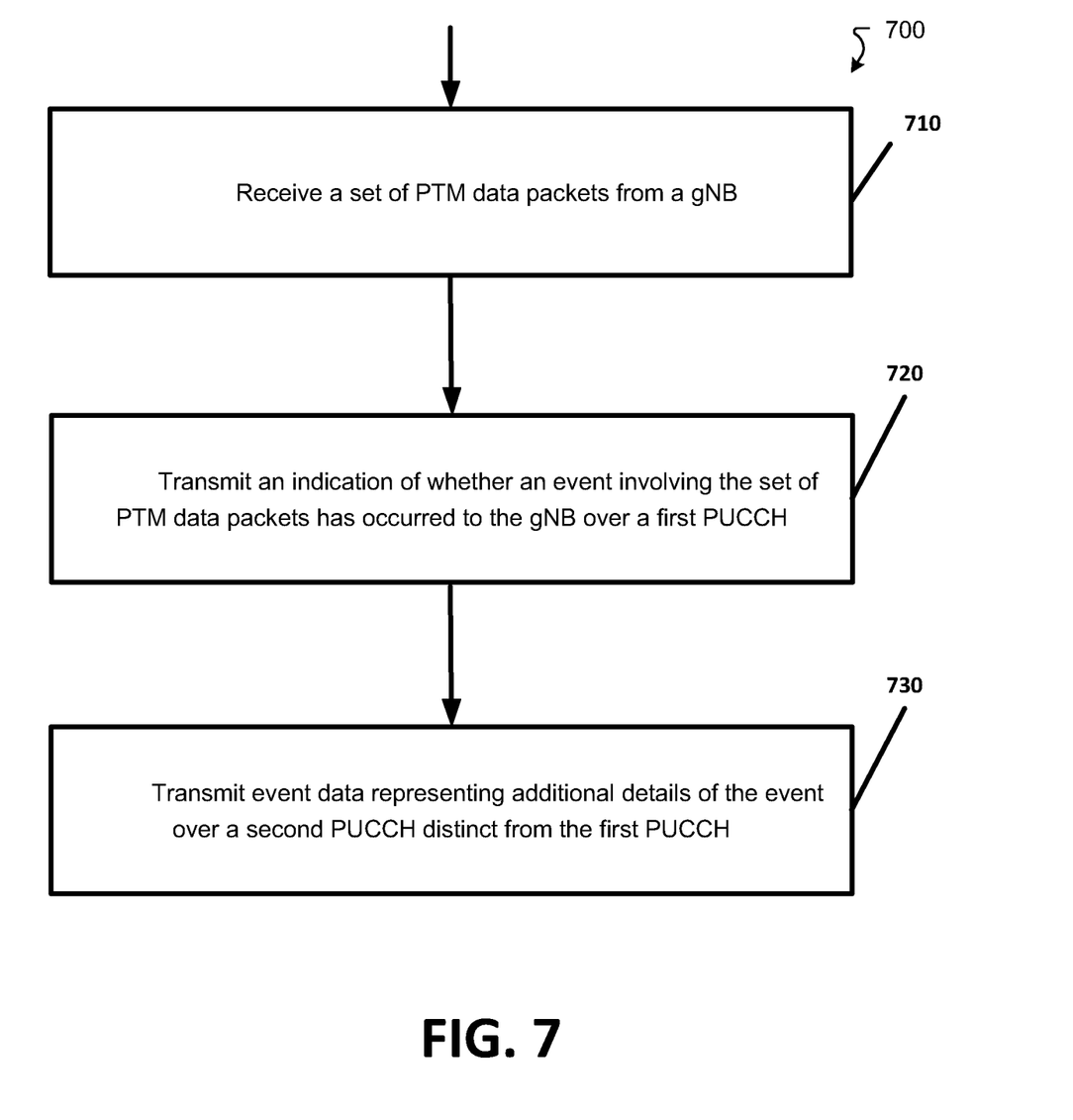
FIG. 7 is a flow chart illustrating a process of performing two-level HARQ feedback according to an example implementation.

Example 1-1: FIG. 7 is a flow chart illustrating an example method 700 of performing the improved techniques. Operation 710 includes receiving, by a user equipment (UE), a set of point-to-multipoint (PTM) data packets from a base station (gNB). Operation 720 includes, after receiving the set of PTM data packets, transmitting an indication of whether an event involving the set of PTM data packets has occurred to the gNB over a first physical uplink control channel (PUCCH). Operation 730 includes, in response to the occurrence of the event, transmitting event data representing additional details of the event over a second PUCCH distinct from the first PUCCH.

Example 1-2: According to an example implementation of Example 1-1, wherein the second PUCCH is allocated to the UE in response to the occurrence of the event.

Example 1-3: According to an example implementation of Example 1-1, wherein the event is a packet reception error at the UE, and the indication of the event includes a NACK indicator.

Example 1-4: According to an example implementation of Example 1-1, wherein the event is a multiple packet reception error at the UE in which the number of packets lost is less than a specified number of packets, and the indication of the event includes identifiers of lost packets.

Example 1-5: According to an example implementation of Example 1-1, wherein the event is a multiple packet reception error at the UE in which the number of packets lost is greater than a specified number of packets, and the indication of the event includes a NACK indicator.

Example 1-6: According to an example implementation of Example 1-1, wherein the event is a multiple packet reception error at the UE, and the indication of the event include the number of packets lost.

Example 1-7: According to an example implementation of Example 1-1, wherein the second PUCCH is deallocated in response to a second event.

Example 1-8: According to an example implementation of Example 1-7, wherein the second event is the transmission of the event data.

Example 1-9: According to an example implementation of Example 1-7, wherein the second event is a passage of a specified amount of time.

Example 1-10: According to an example implementation of Example 1-7, wherein the second event is a number of ACK messages received by a counter exceeding a threshold.

Example 1-11: According to an example implementation of Example 1-7, wherein the second event is a command to deallocate the second PUCCH received from gNB.

Example 1-12: According to an example implementation of Example 1-9, wherein the specified amount of time is set by a network that includes the gNB using radio resource control (RRC) signaling.

Example 1-13: According to an example implementation of Example 1-9, wherein a passage of amount of time is measured using a timer, and wherein the method further comprises determining that a second event has occurred while the second PUCCH has been allocated; and, in response to the determining that the second event has occurred, restarting the timer.

Example 1-14: According to an example implementation of Example 1-1, wherein the additional details of the event transmitted over the second PUCCH include an identifier of one or more missing data packets.

Example 1-15: According to an example implementation of Example 1-1, wherein the UE is in CONNECTED mode.

Example 1-16: According to an example implementation of Example 1-1, wherein the second PUCCH includes a cyclic redundancy check (CRC).

Example 1-17: According to an example implementation of Example 1-16, further comprising receiving the set of PTM data packets from the gNB, the gNB retransmitting the set of PTM data packets in response to the CRC indicating a decoding error.

Example 1-18: An apparatus comprising means for performing a method of any of Examples 1-1 to 1-17.

Example 1-19: A computer program product including a non-transitory computer-readable storage medium and storing executable code that, when executed by at least one data processing apparatus, is configured to cause the at least one data processing apparatus to perform a method of any of Examples 1-1 to 1-17.

Figure 8:
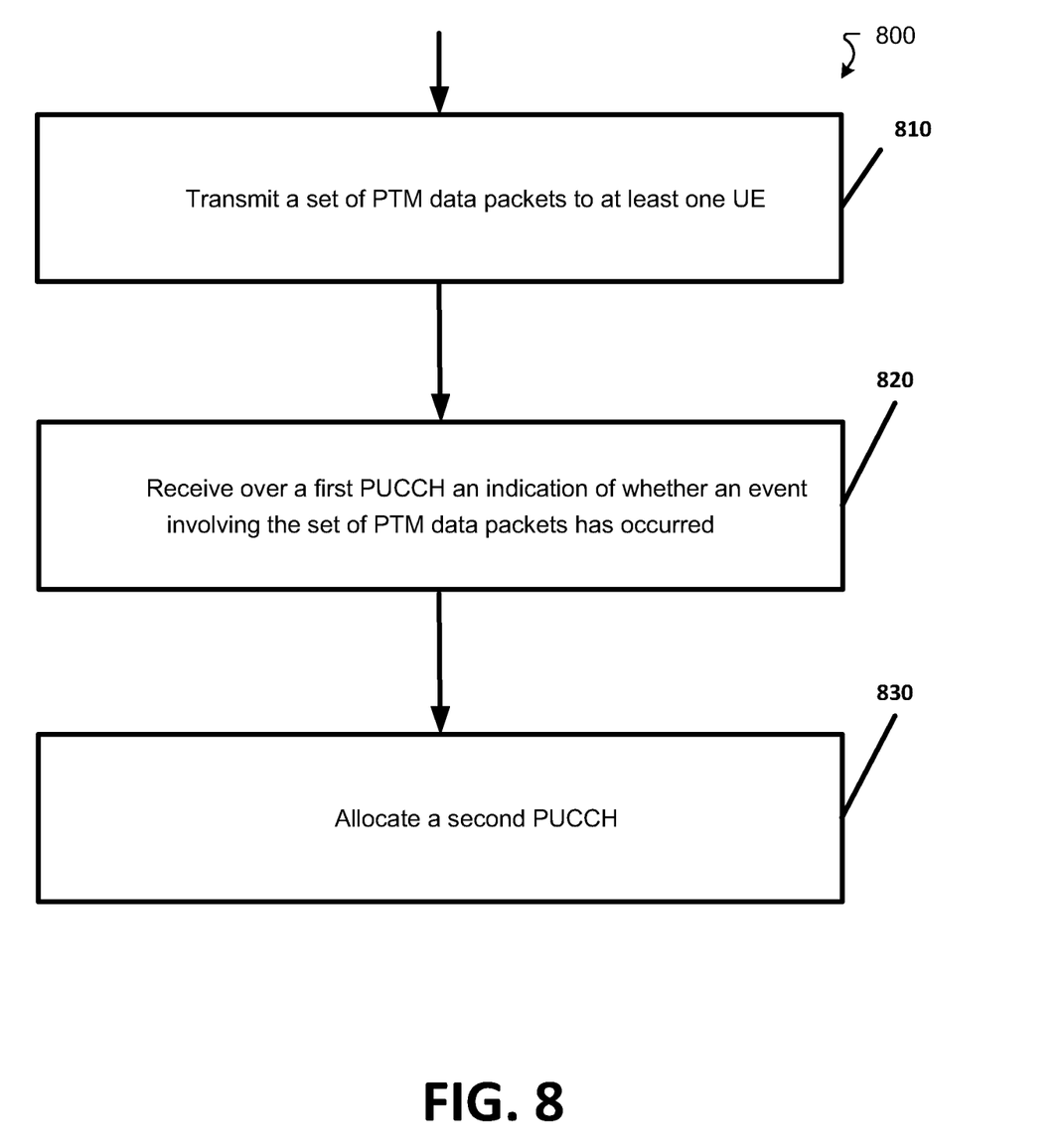
FIG. 8 is a flow chart illustrating a process of performing two-level HARQ feedback according to an example implementation.

Example 2-1: FIG. 8 is a flow chart illustrating an example method 400 of performing the improved techniques. Operation 810 includes transmitting, by a base station (gNB), a set of point-to-multipoint (PTM) data packets to at least one user equipment (UE). Operation 820 includes receiving, over a first physical uplink control channel (PUCCH) from a UE, an indication of whether an event involving the set of PTM data packets has occurred. Operation 830 includes, in response to the indication indicating that the event has occurred, allocating a second PUCCH distinct from the first PUCCH to the UE.

Example 2-2: According to an example implementation of Example 2-1, further comprising receiving event data representing additional details of the event over the second PUCCH.

Example 2-3: According to an example implementation of Example 2-1, wherein the event is a loss of at least one of the set of PTM data packets, and wherein receiving the indication of whether the event occurred includes receiving, as the indication over the first PUCCH, a NACK indicator.

Example 2-4: According to an example implementation of Example 2-3, wherein the event is a loss of at least one of the set of PTM data packets, and wherein the method further comprises receiving, over the second PUCCH, an identifier identifying the at least one data packet of the set of PTM data packets that was lost.

Example 2-5: According to an example implementation of Example 2-3, further comprises deallocating the second PUCCH in response to a second event, and transmitting a command to the UE to deallocate the second PUCCH.

Example 2-6: According to an example implementation of Example 2-5, wherein the second event is a reception of event data representing additional details of the event over the second PUCCH.

Example 2-7: According to an example implementation of Example 2-5, wherein the second event is a passage of a specified amount of time.

Example 2-8: According to an example implementation of Example 2-5, wherein the second event is a number of ACK messages received by a counter exceeding a threshold.

Example 2-9: According to an example implementation of Example 2-7, wherein a passage of amount of time is measured using a timer, and wherein the method further comprises in response to the reception of event data representing additional details of the event, restarting the timer.

Example 2-10: According to an example implementation of Example 2-1, wherein the second PUCCH includes a cyclic redundancy check (CRC).

Example 2-11: According to an example implementation of Example 2-10, further comprising retransmitting the set of PTM data packets in response to the CRC indicating a decoding error.

Example 2-12: An apparatus comprising means for performing a method of any of Examples 2-1 to 2-11.

Example 2-13: A computer program product including a non-transitory computer-readable storage medium and storing executable code that, when executed by at least one data processing apparatus, is configured to cause the at least one data processing apparatus to perform a method of any of Examples 2-1 to 2-11.

LIST OF EXAMPLE ABBREVIATIONS

| | |
|---|---|
| CRC | Cyclic Redundancy Check |
| DCI | Downlink Control Information |
| DL | Downlink |
| gNB | Next generation (5G) Node B |
| MCS | Modulation and Coding Selection |
| MPDCCH | MTC Physical Downlink Control Channel |
| NR | New Radio (5G) |
| PDCCH | Physical Downlink Control Channel |
| PDSCH | Physical Downlink Data Channel |
| PRACH | Physical Random Access Channel |
| PRB | Physical Resource Block |
| PTM | Point to Multipoint |
| PTP | Point to Point |
| PUCCH | Physical Uplink Control Channel |
| PUSCH | Physical Uplink Shared Channel |
| RAN | Radio Access Network |
| RRC | Radio Resource Control |
| TRP | Transmission and Reception Point |
| UE | User Equipment |
| UCI | Uplink Control Information |

Figure 9:
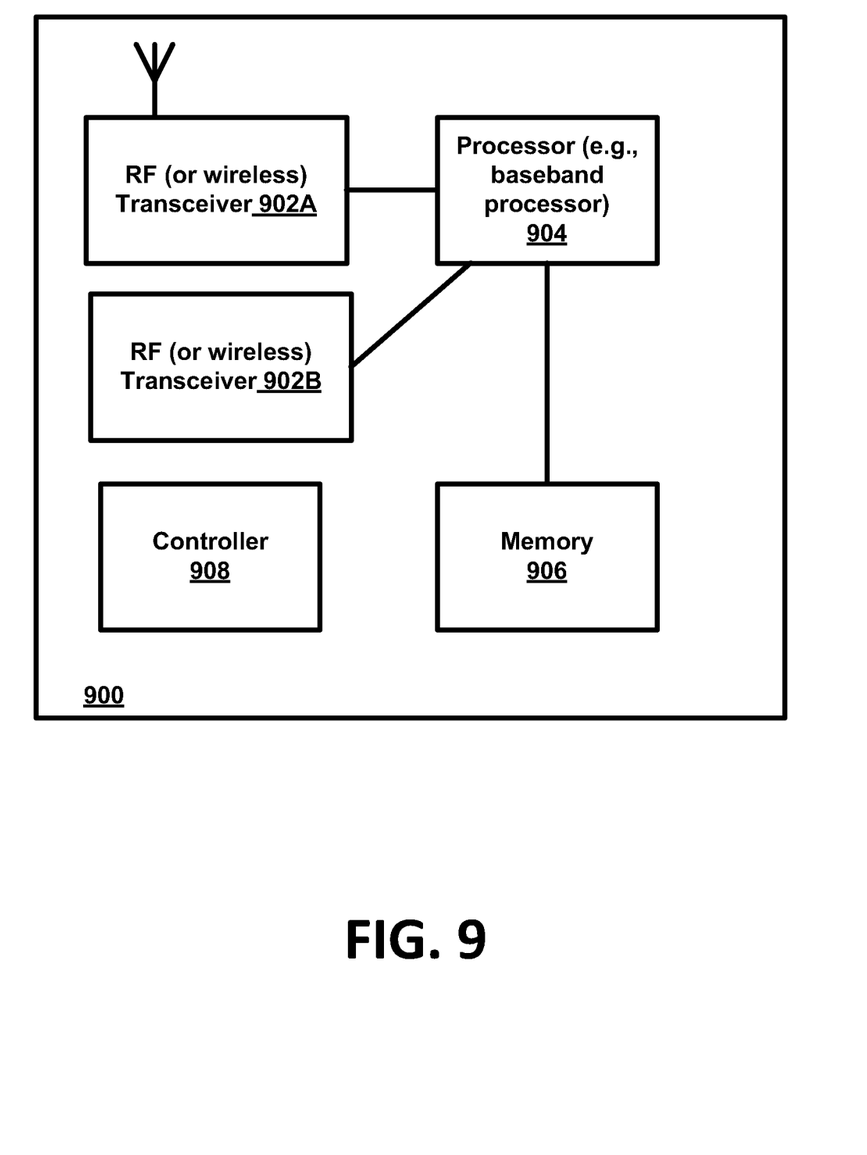
FIG. 9 is a block diagram of a node or wireless station (e.g., base station/access point, relay node, or mobile station/user device) according to an example implementation.

FIG. 9 is a block diagram of a wireless station (e.g., AP, BS, e/gNB, NB-IoT UE, UE or user device) 900 according to an example implementation. The wireless station 900 may include, for example, one or multiple RF (radio frequency) or wireless transceivers 902A, 902B, where each wireless transceiver includes a transmitter to transmit signals (or data) and a receiver to receive signals (or data). The wireless station also includes a processor or control unit/entity (controller) 904 to execute instructions or software and control transmission and receptions of signals, and a memory 906 to store data and/or instructions.

Processor 904 may also make decisions or determinations, generate slots, subframes, packets or messages for transmission, decode received slots, subframes, packets or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:
1. An apparatus, comprising:
at least one processor; and
at least one non-transitory memory storing instructions that, when executed with the at least one processor, cause the apparatus at least to:
receive a set of point-to-multipoint data packets from a base station;
after receiving the set of point-to-multipoint data packets, transmit an indication of whether an event involving the set of point-to-multipoint data packets has occurred to the base station over a first physical uplink control channel;
in response to the occurrence of the event, transmit event data representing additional details of the event over a second physical uplink control channel distinct from the first physical uplink control channel,
wherein the second physical uplink control channel includes a cyclic redundancy check for error detection,
wherein the second physical uplink control channel is dynamically granted by the base station,
wherein the second physical uplink control channel is allocated to the apparatus in response to the occurrence of the event,
wherein the second physical uplink control channel is deallocated in response to a second event,
wherein the second event is a passage of a specified amount of time,
wherein the specified amount of time is set with a network that includes the base station using radio resource control signaling, and
wherein the passage of the specified amount of time is measured using a timer;
if the cyclic redundancy check indicates a decoding error, receive the set of point-to-multipoint data packets retransmitted from the base station;
determine that the second event has occurred while the second physical uplink control channel has been allocated; and
in response to the determining that the second event has occurred, restart the timer.

* * * * *